Nov. 9, 1926.

J. H. VICTOR 1,606,608

PUNCH AND DIE

Original Filed Feb. 21, 1921      6 Sheets-Sheet 1

Inventor

John H Victor

Daniel J Brennan.

Attorney.

Nov. 9, 1926.

J. H. VICTOR 1,606,608

PUNCH AND DIE

Original Filed Feb. 21, 1921   6 Sheets-Sheet 2

Fig. 2.

Inventor.
John H. Victor
By Daniel J. Brennan.
Attorney

Nov. 9, 1926.

J. H. VICTOR 1,606,608

PUNCH AND DIE

Original Filed Feb. 21, 1921    6 Sheets-Sheet 3

Fig. 3.

Inventor:
John H Victor
By Daniel J Brennan.
Attorney.

Nov. 9, 1926.　　　　　　　　　　　　　　　　　1,606,608
J. H. VICTOR
PUNCH AND DIE
Original Filed Feb. 21, 1921　　6 Sheets-Sheet 4

Inventor.
John H. Victor
Daniel J. Brennan.
Attorney.

Nov. 9, 1926.                                                      1,606,608
                        J. H. VICTOR
                       PUNCH AND DIE
              Original Filed Feb. 21, 1921    6 Sheets-Sheet 5

Inventor.
John H. Victor
By Daniel J. Brennan.
Attorney

Nov. 9, 1926. 1,606,608
J. H. VICTOR
PUNCH AND DIE
Original Filed Feb. 21, 1921   6 Sheets-Sheet 6

Inventor.
John H. Victor
By Daniel J. Brennan.
Attorney

Patented Nov. 9, 1926.

1,606,608

UNITED STATES PATENT OFFICE.

JOHN H. VICTOR, OF CHICAGO, ILLINOIS, ASSIGNOR TO VICTOR MANUFACTURING & GASKET CO., A CORPORATION OF ILLINOIS.

PUNCH AND DIE.

Application filed February 21, 1921. Serial No. 446,741. Renewed March 14, 1925.

This invention relates to improvements in punching machines, and it is an object of the invention to provide a punching press which may have the ordinary carriage for the punch and the ordinary table for the die, with a carrier by which a large number of the articles to be finished are simultaneously moved to operative position.

It is also an object of the invention to provide a machine of this character with means whereby the unfinished articles are automatically transferred to the carrier prior to arrival of the carrier in operative position.

It is also an object of the invention to provide a feeding device for the articles and to dispose this device with relation to the carrier so that the articles are introduced in predetermined arrangement into seats of the carrier.

The invention also contemplates the provision of a safety device or guard controlling a clutch which serves for throwing the press into operation, the safety device rendering a movement of the clutch impossible until the carrier is in a position in which the punches may act upon the articles of the carrier in the proper way.

The invention also has the object of providing an improved punch and die, certain parts of the punch and certain parts of the die being supported yieldingly, while other parts of punch and die are rigidly secured to their seats, in co-operation with the yielding parts to effect the shaping of the articles in the desired way.

With these and numerous other objects in view, an embodiment of the invention has been described in the following specification, and the novel features have been pointed out in the appended claims. The specification makes reference to the accompanying drawing wherein:

Fig. 3 is a top plan view of the table and partly a horizontal section through parts of the machine frame;

The frame of the machine comprises the substructure 1 and top structure 2 combined with a table 3. A shaft 4 which passes through the top structure 2 carries at one end a pulley 5, which may be driven by a transmission belt (not shown) in a suitable way and which is loose on the shaft 4. A spring controlled key 6 has a tendency to connect this pulley operatively with the shaft 4, if a clutch 7 is actuated to release said key to the action of its spring (not shown). All of these parts may be of standard construction or of any other suitable new construction and no claim is made to the arrangement of these parts or to the mechanism for actuating the press itself.

The shaft 4 has eccentric portions 8 on which the pitmen 9 are mounted so as to reciprocate when the shaft 4 is being rotated. The lower ends of the pitmen 9 are secured to a slide 10 which is guided by the plates 11, fastened to the uprights of the top structure. The punch carriage 12, at the lower end of the slide 10, is adjustably connected with the pitmen 9 in any desired way, as for instance, in the manner shown in the drawing, whereby each side of the carriage may be adjusted independently of the other, or whereby both sides may be adjusted at the same time. These parts also are known, or are of no particular interest for the present invention. A plate 13, carrying the punches, preferably in regular arrangement, is secured to the lower end of the carriage 12, as for instance, by the bolts 14 shown in Fig. 5.

The table 3 of the press is extended laterally as well as to the front and rear of that part which is in opposition to the punch carrier. These extensions serve for supporting a carrier plate 15, while the same is being moved cyclically from a position in which the unfinished articles are inserted to a position between the jaws of the press, where the treatment occurs and to a position whereby in the continued travel of this plate, the finished articles are automatically ejected and the plate is made ready to receive a new charge of unfinished articles.

Figure 12:
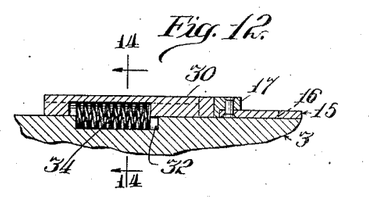
Fig. 12 is a similar sectional view through a cooperating locking device for the carrier plate of the articles, taken on line 12—12 of Fig. 3.
Figure 13:
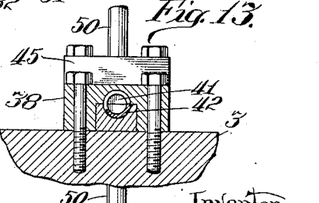
Fig. 13 is a transverse sectional view on line 13—13 of Fig. 11.
Figure 14:
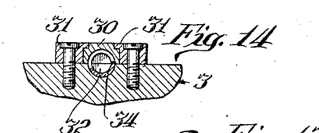
Fig. 14 is a transverse sectional view on line 14—14 of Fig. 12.

This plate 15, portions of which are illustrated in Figs. 3, 7, 14 and 23, comprises preferably a sheet metal member having openings 16, which are arranged in horizontal series, i. e. in lines parallel to the front edge of the plate, the corresponding openings in these series being again grouped in vertical alignment, i. e. in lines parallel to the lateral edges of the plate. The lateral edges of the plate 15 are reinforced by bars 17, which are riveted thereto, Figs. 3, 12, 20, or are fastened on the plate in some other suitable way. The plate is guided in a predetermined path on the machine, by guiding ledges or bars 18 which project from the bed of the machine upward.

Figures 6, 7, 8, 9, 10:
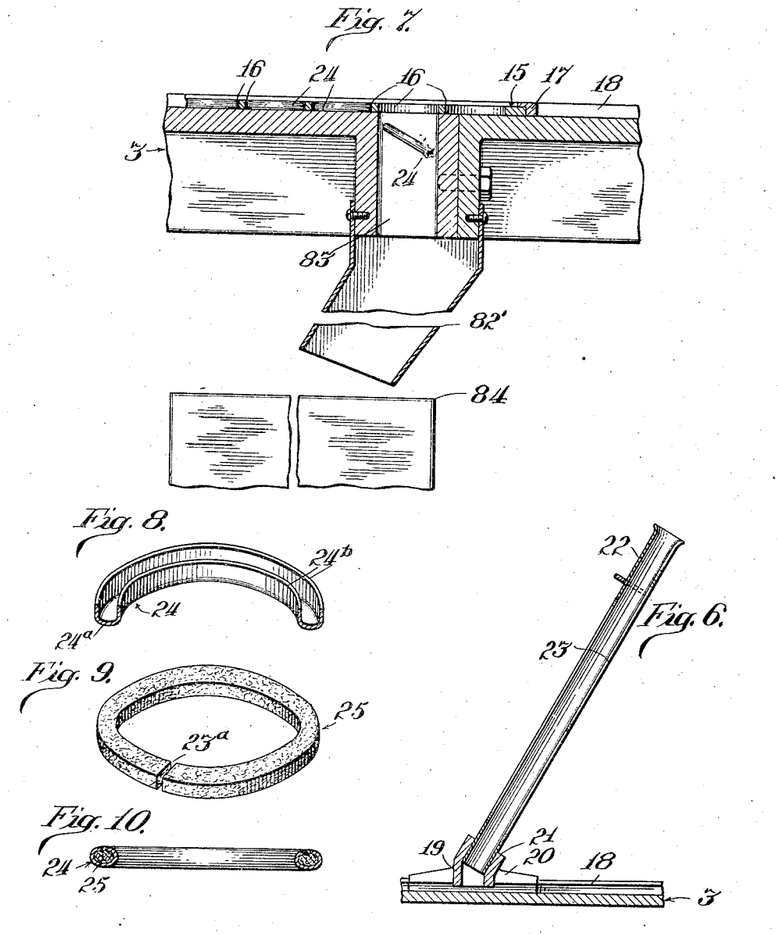
Fig. 6 is a detail section through one of the feeding chutes.
Fig. 7 is a detail sectional view of the discharge chute.
Fig. 8 is a perspective and sectional view of a portion of an unfinished article which is to be finished in the machine.
Fig. 9 is a perspective view of an unfinished filler ring for the article.
Fig. 10 is a sectional view through the finished article.
Figure 11:
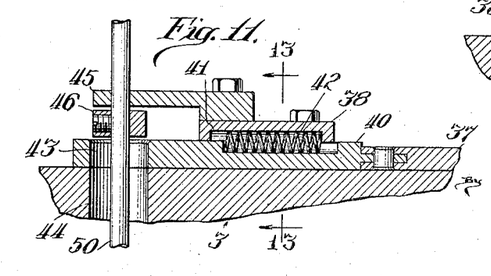
Fig. 11 is an enlarged sectional view through the safety device for the clutch rod, the section being taken on line 11—11 of Fig. 3.

The guides 18 with which the edge reinforcements 17 of the plate remain in sliding contact, support at a predetermined point in the path of the plate a transverse bar 19 which is raised above the top surface of the guides 18 by foot portions 20, Fig. 3. This bar 19 is equipped with a plurality of tubular studs 21 which project from the plate upwardly and are at their upper end inclined in direction of the travel of the plate 15. Tubular chutes 22 are inserted into these studs as shown in Fig. 6 and these chutes may be provided in one of their walls with an axial slot 23, so as to show at any time just how many of the articles inserted into these chutes are still present therein. The upper ends of these chutes are flared as shown in Fig. 6, to facilitate the introduction of the articles which are illustrated in Figs. 8, 9 and 10.

The present machine is primarily intended for the manufacture of gaskets or washers for spark plugs or the like which are needed in large quantities. These washers as well as washers for other purposes comprise a metal body combined with some pliable or flexible member to absorb the frequent strains set up by the explosions; at the same time the washers must be adapted to effectively resist the high temperatures produced by these explosions.

For this purpose the finished article as shown in Fig. 10, consists of a hollow annular member 24 in which a filler 25 also of annular shape is inserted; this filler may consist of a mixture of fibrous materials containing a relatively high percentage of asbestos so as to resist high temperatures. The annular member 24 is produced in the shape of a ring-shaped trough as indicated in Fig. 8 having an approximately flat bottom $24^a$, and two up-standing annular walls $24^b$. A ring of asbestos or the like and having approximately rectangular cross-section as indicated at $23^a$, is cut of such size as to fit into the trough shown in Fig. 8.

The present machine serves for compressing the lateral walls $24^b$ of the trough-shaped member so as to close over the filler $23^a$, and at the same time for deforming the assembled parts so as to avoid all sharp corners or edges, the finished article having the shape illustrated in Fig. 10. The hollow annular members 24, while containing the asbestos rings 25, are introduced into the chutes 22, where they are piled up, one on the other in stack form.

In the passage of the plate 15 below the transverse bar 19 these assembled elements will drop by gravity into the openings 16 of the plate, which openings register serially with the discharge openings of the bar 19. The carrier 15 will thereby be charged automatically with the articles to be treated and each of these articles will be properly seated in one of the openings 16 and will by the continued cyclic movement of the plate be carried along until the entire charged plate has entered the space between the die carrier and the punch carrier of the machine.

Figure 1:
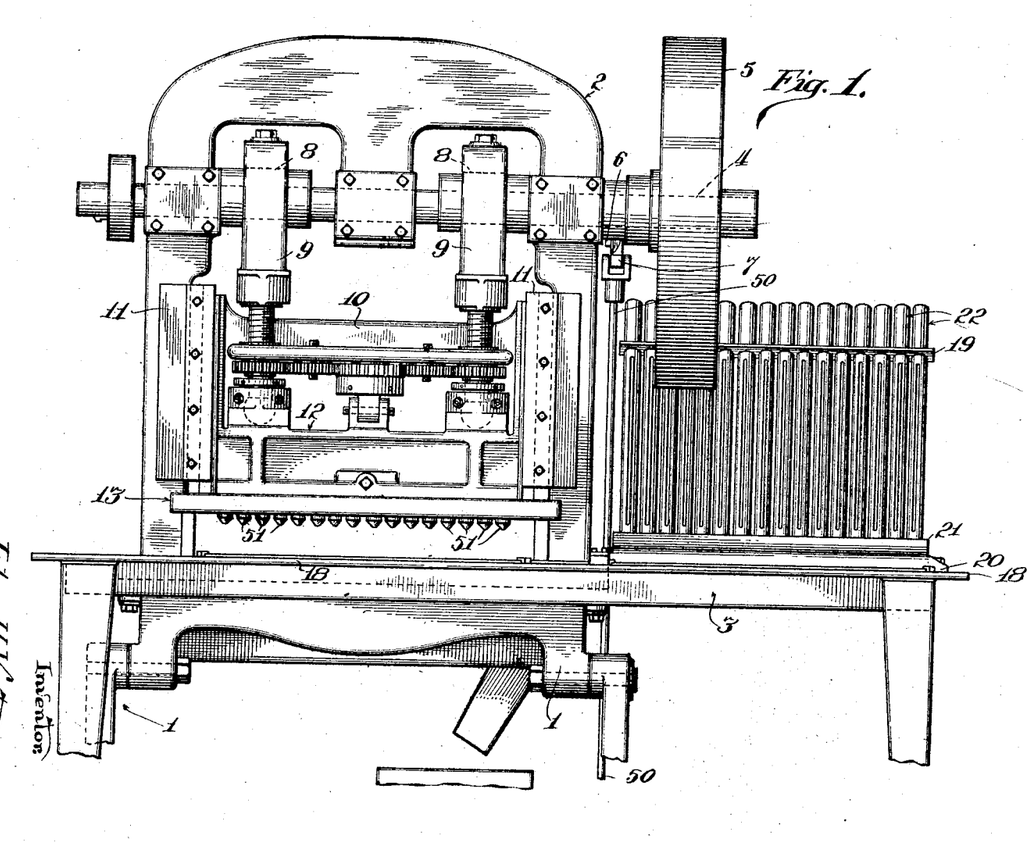
Fig. 1 is a front elevation of the complete machine.
Figure 2:
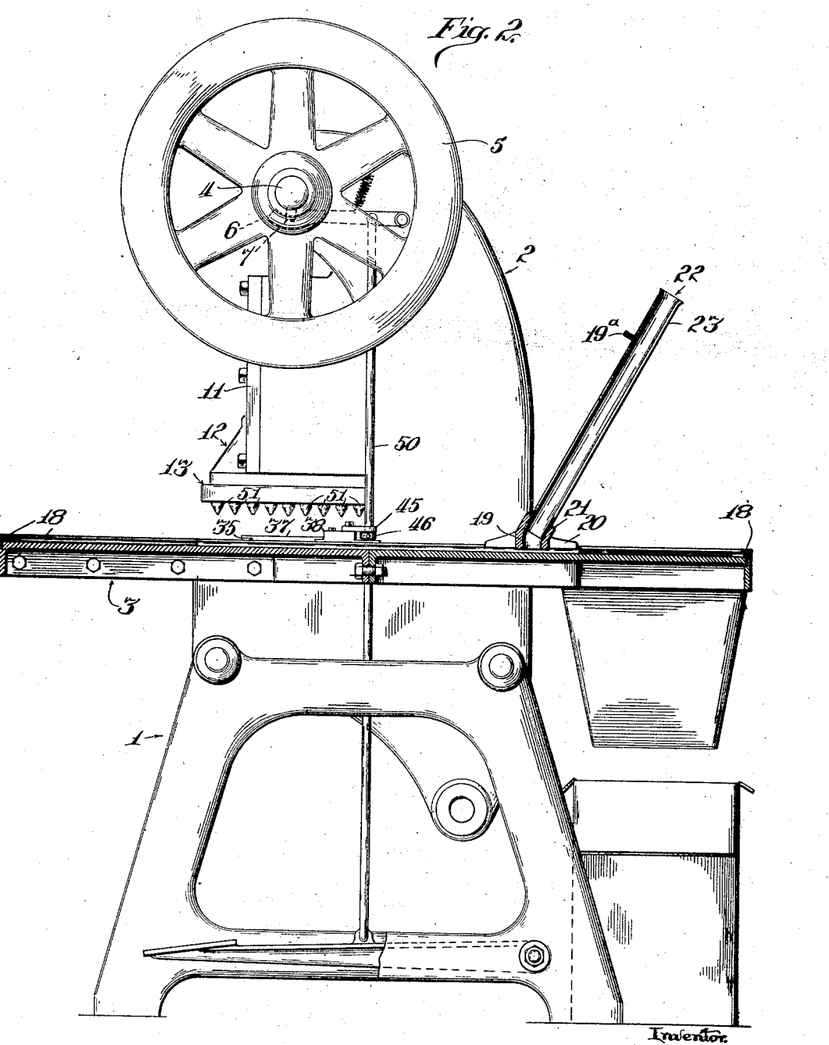
Fig. 2 is a side elevation and partly vertical section through the same.
Figure 4:
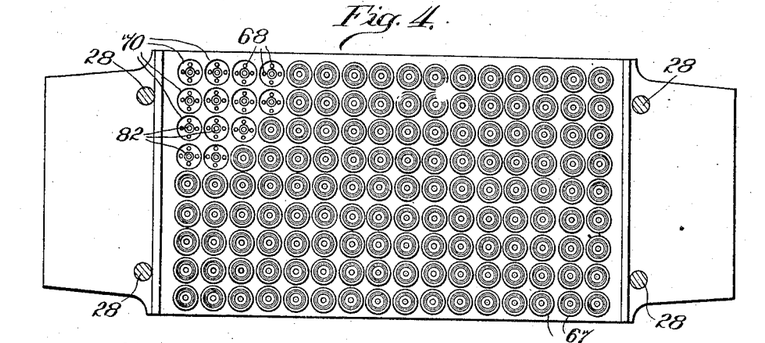
Fig. 4 is a top plan view of the die carrier.
Figure 5:
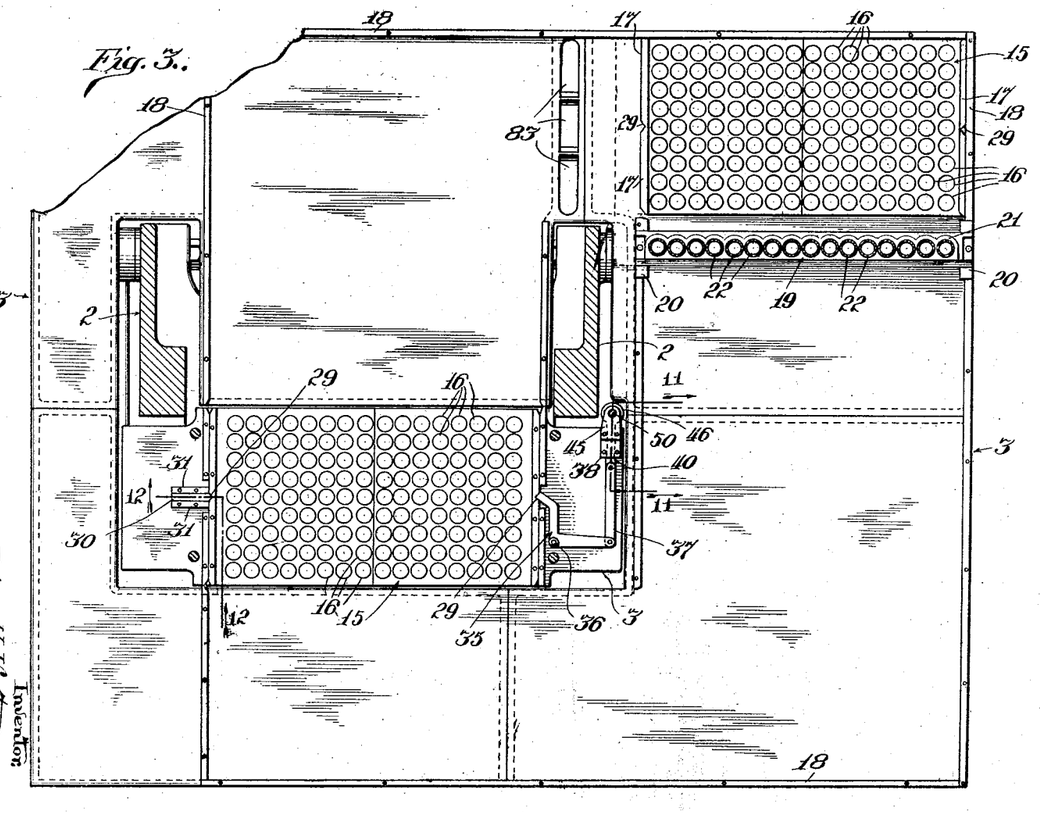
Fig. 5 is a bottom plan view of the punch carrier.

The punch carrier, as shown in Fig. 5, comprises the heavy plate 13 which is fastened to the reciprocating carriage of the punch press. The arrangement of punch seats on the plate 13 is similar to the distribution of the openings 16 in the carrier plate 15. The die carrier as shown in Fig. 4 is fastened in some suitable way by bolts 28 to the bed of the machine and contains seats for the dies which are similarly arranged.

The machine is equipped with means which prevent an operation of the machine if the carrier plate 15 is not in that alignment which is necessary for the proper cooperation of the punches with the articles. The reinforcing ledges 17 on the margins of the plate are therefore provided each with a notch 29 which is adapted to receive locking elements for holding the plate 15 against accidental displacement. According to Figs. 3, 12 and 14, a locking bar 30 is guided between two bars 31 which are secured on the immovable bed. Between these bars 31 the bed plate 3 has a semi-cylindrical recess 32 and a semicylindrical recess is provided on the under surface of the pointed latch bar 30. These two recesses, which supplement each other to a cylindrical recess, serve for receiving a spring 34, which has a tendency to advance the bar 30 permanently into a position in which it will enter the notch 29 on the lateral reinforcing bar 17 of the carrier plate 15 whenever the latter is in operative position. On the other side of the bed 3 a bell crank lever 35 is mounted on the pivot pin 36. One end of this bell crank lever is bent to engage the notch 29 in the bar 16, and the other end of the lever is connected by a link 37 with a bar 40, which is guided for rectangular sliding movement on the bed 3 through a casing 38 also secured to the bed. A semicylindrical recess 41 on the lower surface of the casing is supplemented to a cylindrical recess by a circular cut out portion in the top surface of the sliding bar. A helical spring 42, which is seated in this cavity, has a tendency to force the bar 40 outwardly into a position in which the link 37 will throw tht bell crank lever 35 into engagement with the notch 29 on the plate carrier.

The free end of the bar 40 is provided with a circular opening 43, which in this position registers with a bore 44 in the bed plate, this bore serving for the passage of the rod 50, through which the clutch 7 of the machine is manipulated.

This rod is furthermore guided by a bracket 45 which is mounted on the forward end of the casing 38, the opening in the bracket 45 being just large enough to permit of sliding movement of this rod. A collar 46 is secured to the rod 50 between the bar 40 and the bracket 45, the diameter of this collar being slightly smaller than the diameter of the opening 43 in the sliding bar 40. It is obvious therefore that the clutch rod cannot be moved vertically in downward direction unless the collar 46 is in registration with the opening 43 in the bar. This registration will occur only when the bell crank lever 35 assumes the position illustrated in Fig. 3, that is, when the notch 29 of the carrier plate 15 is entered by the lever. In this position the articles in the carrier plate are in exact axial alignment with the punches and dies of the machine.

If, however, the opening 43 in the latch bar 40 is out of alignment with the collar 46 on the rod 50, the rod cannot be lowered because the collar cannot enter the opening 43 and the machine cannot be put into operation. By this means the proper registration of the articles on plate 15 with the die and punch, is effectively assured.

Each punch comprises in the main a member 51 which is fixed to the plate 13 by a holding screw 52 entering a cylindrical socket 53 of the stem 54 and having its head seated in a circular recess on the back of the plate. This part of the punch therefore is immovably secured with respect to the punch carrier. The stem 54 is seated in a circular socket 55 of the carrier 13 and is well fitted therein. The outer end of this stem is flush with the lower surface of the plate 13, and a circular enlargement 56 is formed integral with the stem and rests with its shoulder 57 in engagement with the lower surface of the carrier 13 so as to limit the depth of insertion of the stem and to distribute the pressure over a larger surface. Another and larger circular enlargement 58 is below the enlargement 56 and is continued in a cone portion 60, a shoulder 59 between the cone and second enlargement being rounded (Fig. 16,) as shown by the fillet, to shape one circular portion of the metallic envelope 24 for the heat-proof ring 23ª which is to be included in the washer. The cone 60 terminates in a rounded point whereby the punch is properly guided in entering the hole of the articles to be finished and centers these articles with respect to the punch and die.

The two enlargements 56, 58 of the punch are surrounded by a holding-down ring 61 which has an internal shoulder 62 adapted to be seated on the shoulder 63 between the enlargements 56 and 58 of the punch, and the ring is rotatably fitted to the punch. The rear surface of this holding ring is under the control of springs 64 which enter recesses 65 in the punch carrier 13, and from Fig. 5 it will be noted that the pressure of the springs acts on four uniformly spaced points of the ring. These springs, therefore, have a tendency to force the holding down ring 61 into the position indicated in Fig. 15 and in full lines in Fig. 16, wherein the internal shoulder 62 rests on the shoulder 63 of the punch.

Figures 15, 16, 17, 18, 19, 20, 21, 22, 23:
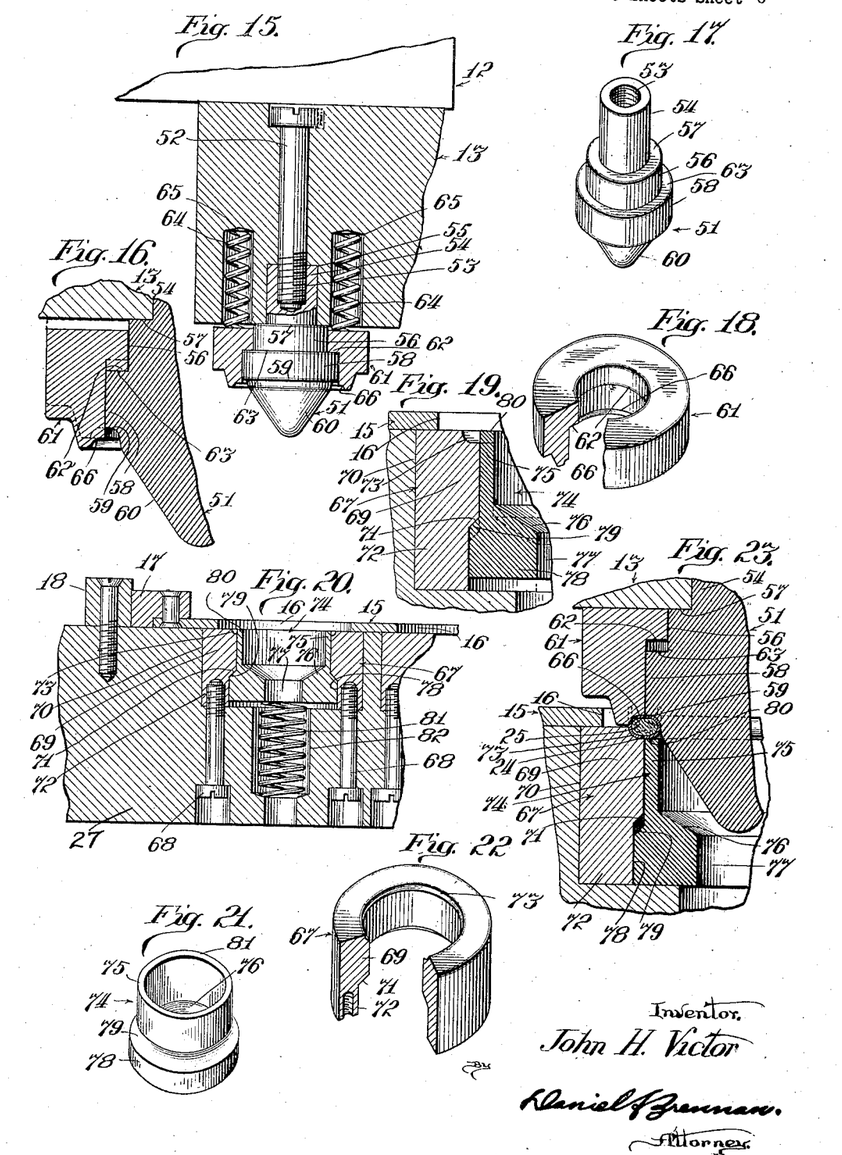
Fig. 15 is a sectional view and partly elevation of a punch with a part of the carriage.
Fig. 16 is a fragmentary enlarged section of the punch combined with a holding down ring.
Fig. 17 is a perspective view of the punch proper.
Fig. 18 is a perspective and partly sectional view of the holding down ring.
Fig. 19 is a fragmentary sectional view of the die with its follower.
Fig. 20 is a section through the die, combined with the die plate, and the article carrier in operative relation thereto.
Fig. 21 is a perspective view of the follower ring of the die.
Fig. 22 is a partly perspective and partly sectional view of the die detached.
Fig. 23 is a fragmentary sectional view through the punch and die between which one of the articles to be treated is shown in finished condition.
Figure 24:
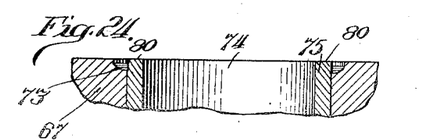
Fig. 24 is a fragmentary sectional view through the die and follower ring, showing the latter in ejecting position.

In the punching operation, however, the ring 61 will encounter the resistance of the article in the carrier plate and will be moved to the position indicated in Fig. 23, against the action of the springs 64. In this position the two upright walls 24$^b$ of the annular trough-shaped member 24, which are shown in dotted lines in Fig. 23, will be bent over the filler member as shown in full lines, the curvature of the bend being defined by the fillet at the shoulder 66 of the holding-down ring 61 and at the shoulder 59 of the punch proper.

Each die includes a ring 67 which is rigidly fixed to the plate 27 by a plurality of screws 68, four of these screws being indicated in Fig. 4 in connection with each of these dies. The ring itself comprises a heavier upper portion 69, the top surface of which is flush with the top surface of the die plate and which is exactly fitted into a corresponding cylindrical recess 70 of this plate; the bottom surface of this ring rests in operative position on the bottom of the recess, and as the ring 67 is held by the screws 68 any axial displacement of this ring is made impossible, the screws at the same time preventing a displacement of the ring in circumferential direction. The portion of the ring which is secured to the die plate by the screws is somewhat thinner than that portion which receives the pressure of the punching operation directly, an inclined annular shoulder 71 leading from the larger portion 69 to the narrower or thinner portion 72 of the ring. The inner circular edge at the top surface of the ring is finished to present a groove-like depression 73 of approximately one quadrant of a circle in cross-section as indicated in Fig. 23.

This ring serves for slidably receiving a follower or other ring member 74, the upper portion 75 of which has a relatively thin wall, while the lower portion 76 is considerably thickened, this lower portion, therefore, having a much narrower center opening 77 than the upper portion. It is reinforced, furthermore, by a circumferential enlargement 78 which is connected with the upper portion 75 through an annular shoulder 79 having an inclination to correspond with the inclination of the shoulder 71. The top surface 80 of the follower ring is turned off straight and the follower is controlled by a spring 81 which has its seat in a recess 82 axially aligned with the main recess of the die plate and acting against the flat lower surface of the follower.

The dies, therefore, may be assembled by first inserting the spring 81 in the recess 82 of the die plate 27 and by introducing then the combined die ring 67 and follower ring 74 into the recess 70 of the plate, whereupon the holding screws 68 may be introduced into the outer ring 67 through the die plate to force it into position as shown in Fig. 20. The spring will normally drive the follower upwardly so that its upper edge is flush with the top surface of the die holder and shoulder 79 contacts shoulder 71. If the elements, however, are in operative position as indicated in Fig. 23, the follower ring will be forced downwardly to the bottom of the recess 70 by the action of the punch, which compresses the article held between the various members of the press, whereby the corners or sharp edges of the articles are deformed to show that curve which is indicated in Fig. 23. When the punch is withdrawn, the follower will automatically lift the article from the seat on the upper edge of the die ring under the action of the spring and will thereby force the finished article into the plane of the carrier plate so that in the advance of this plate the articles will be taken along over the bed of the machine. Owing to the projection of the top surface 80 of the follower ring above the groove portion 73 of the die ring, none of the articles sliding with the carrier plate over the bed surface of the machine can drop back into the plate 27.

In the continued travel of this carrier the articles arrive at that portion of the bed immediately in the rear of the punch carriage, and after having reached the ledge at the rear edge of the bed the carrier is moved along this edge at a right angle to the first mentioned direction, passing in this movement over a slot 83 in the bed plate. This slot, as shown in Fig. 3, is of sufficient width and length to permit an entire series of finished articles to drop therethrough and these articles dropping through the slot enter a short tubular chute 82′ projecting from the lower surface of the bed plate. The lower end of the chute is inclined as shown in Fig. 7 and terminates over a receptacle 84 into which the finished articles are discharged.

The carrier 15 of the articles is now entirely empty after having passed over the slot 83, and is therefore ready to receive through its continued cyclic movement other articles from the feeding chutes illustrated in Fig. 6, these articles automatically dropping in place when the longitudinal series of openings in the carrier pass beneath the lower end of these feeding chutes.

The operation of the device is probably clear from the above description. The empty carrier occupying the position indicated in Fig. 3, may be advanced in direction towards the feeding chutes. Each of the chutes will discharge one of the articles into the pertaining opening of the carrier. This automatic serial discharge is continued in the advance of the carrier until all of the openings of the same have received one of the copper rings combined with the filler inserted therein. Another carrier may be in edge to edge contact with the charged carrier and thereby may receive successively the articles to be treated by its advancement transversely of the series of chutes. The operator may see from the slots in these chutes if they are supplied with a sufficiently large number of the articles to fill all of the openings of the carrier and if one or the other or all of them should not have the proper number they may be charged independently of each other with the articles.

In the continued advance of the charged carrier it will arrive at the front edge of the machine and will then be guided along the ledges thereon to a position in which it will be guided by one ledge in direction towards the operative parts of the machine. That carrier which has been in place between the die plate and the punch carriage will be pushed out of its position by the succeeding carrier plate, overcoming thereby the resistance of the holding devices 30 and 35 which have entered the notches 29 on the sides of the carrier. Only after the succeeding carrier is in proper registration for permitting the punches to center the articles properly, the locking devices will automatically be forced into holding position and will thereby render feasible the actuation of the clutch rod which actuation, up to that time, has been prevented owing to the fact that the ring on the clutch rod could not be introduced into the opening of the holding device.

Upon operation of the clutch the punch carriage with its entire set of punches will be forcibly lowered and the conical points of the punches will enter the holes in the copper rings so as to truly center the same with respect to the dies. At the same time the filleted shoulders on the enlargement and holding-down ring will bend both of the upper ends of the lateral walls of the annular troughs in conformity with the curvature of these fillets and the outer lower ring edge of these troughs also will be deformed in accordance with the filleted shoulder of the die ring. This will of necessity cause a deformation of the fourth or inner lower edge of the articles to be shaped, indicated in Fig. 23.

Upon withdrawal of the punches the following rings will force the finished articles into the plane of the article carriers, and will assist in retaining them in this elevated position, the carriers then being again advanced. If for some reason, one or more of the articles should not have been properly deformed by the operation of the punches, the clutch can be thrown in again or can be held in operative position to repeat the punching operation as the articles will be re-centered in each descent of the punches. The article carrier is advanced until it reaches the rear edge of the bed and is slid along the rear edge in engagement with the guiding edge until the finished articles are discharged serially through the chute in the bed. The carrier is then ready to begin its cyclic movement again.

I claim:

1. In combination with a tool, a carrier plate for holding the articles to be treated by the tool, said carrier plate being provided with a plurality or series of openings extending parallel to one edge of the plate, the openings in the series being arranged in groups which extend parallel to other edges of the plate, a bed, and bed extensions on which the carrier plate is movable to and from the point of operation.

2. In a machine of the character described, the combination of a bed, an article carrier movable on the bed, and a series of feed chutes in parallel arrangement and having their axes intersecting the path of the carrier, said chutes being provided with means for rendering the entire contents visible at all times.

3. In a machine of the character described the combination of a bed, an article carrier movable on the bed, a series of slotted feed chutes disposed so as to direct the articles from said chutes on the carrier, and means for supporting the ends of the chutes in a plane different from the plane of travel of the carrier.

4. In a machine of the character described, the combination of a set of tools, a bed, an article carrier movable on the bed, the article carrier having a notch in one of its edges, and an automatic device cooperating with said notch for retaining the article carrier in predetermined position with respect to the tools.

5. In a machine of the character described, the combination of a bed, an article carrier movable on the bed, the article carrier having several notches on its edges, and a plurality of independently acting, automatically locking means in cooperation with said notches for retaining the carrier in predetermined position on the bed.

6. In a machine of the character described, the combination of a bed, a carrier movable thereon, the carrier being provided with notches in opposition to each other, and independently acting locking means adapted to simultaneously enter said notches for retaining the carrier in a predetermined position on the bed.

7. In a machine of the character described, the combination of a set of tools, a drive for imparting operative movement to the same, a bed, an article carrier movable on the bed, means for locking said article carrier in a predetermined position with respect to the tools, and means for rendering the drive of tools operative, said last named means being controlled by the locking means.

8. In a machine of the character described, the combination of a set of tools, a drive shaft for the same, a clutch on the shaft, a bed, a carrier for the articles movable on said bed, elements for locking the carrier in predetermined position with respect to the tools, and means for preventing actuation of the clutch when said locking elements are in inoperative position.

9. In a machine of the character described, the combination of tools, a drive shaft for the tools, a clutch on said shaft normally in inoperative position, a bed, an article carrier movable on the bed, an element for locking the carrier in a predetermined position with respect to the tools and means associated with said locking element for permitting release of the clutch when the locking element is in operative position.

10. In a machine of the character described, the combination of a tool, a bed, a carrier movable on the bed, a drive shaft for the tool, a clutch on said driving shaft, a device for automatically retaining the carrier in operative position with respect to the tool, said locking device while in inoperative position preventing actuation of the clutch and permitting when in operative position the actuation of the same.

11. In a machine of the character described, the combination of a tool, a bed, a carrier movable on the bed, a drive shaft for the tool, a clutch normally in inoperative position on said shaft, a locking device for the carrier movable in a horizontal plane and adapted to hold the carrier automatically in operative position with respect to the tool, a clutch rod movable in a vertical plane, and means on the rod for preventing the vertical movement when the locking device is not in operative position.

In testimony whereof, I affix my signature at 36 West Randolph St., Chicago, Illinois.

JOHN H. VICTOR.